(12) United States Patent
Xu et al.

(10) Patent No.: US 10,015,284 B2
(45) Date of Patent: Jul. 3, 2018

(54) METHOD FOR BROWSING WEBPAGE PICTURE AND CLIENT DEVICE THEREFOR

(71) Applicant: TENCENT TECHNOLOGY (SHENZHEN) COMPANY LIMITED, Shenzhen, Guangdong (CN)

(72) Inventors: Fei Xu, Shenzhen (CN); Yuewei Fan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 657 days.

(21) Appl. No.: 14/261,291

(22) Filed: Apr. 24, 2014

(65) Prior Publication Data

US 2014/0324954 A1    Oct. 30, 2014

Related U.S. Application Data

(63) Continuation of application No. PCT/CN2012/076707, filed on Jun. 11, 2012.

(30) Foreign Application Priority Data

Oct. 27, 2011 (CN) .......................... 2011 1 0331362

(51) Int. Cl.
G06F 15/16     (2006.01)
H04L 29/06     (2006.01)
G06F 17/30     (2006.01)

(52) U.S. Cl.
CPC ........ *H04L 67/42* (2013.01); *G06F 17/30905* (2013.01)

(58) Field of Classification Search
CPC ...................................................... H04L 67/42
See application file for complete search history.

(56) References Cited

U.S. PATENT DOCUMENTS

2005/0033824 A1* 2/2005 Takahashi ......... G06F 17/30902
                                                              709/217
2005/0055426 A1* 3/2005 Smith ............... G06F 17/30902
                                                              709/219

(Continued)

FOREIGN PATENT DOCUMENTS

CN    101287035 A    10/2008
CN    101521854 A     9/2009

(Continued)

OTHER PUBLICATIONS

Office Action Issued in Chinese Patent Application 201110331362.5, dated Sep. 9, 2015, 8 pages.

(Continued)

*Primary Examiner* — Karen Tang
(74) *Attorney, Agent, or Firm* — Knobbe Martens Olson & Bear LLP (57) ABSTRACT

The present disclosure, pertaining to the field of computer technologies, relates to a method for browsing a webpage picture and a client device therefor. The method includes: receiving, by a client device, a picture mode triggered by a user when browsing a webpage; acquiring a picture on the webpage to be browsed by the user; and displaying the picture to the user. The client device includes: a receiving module, a first acquiring module, and a displaying module. According to the present disclosure, when a user is only interested in pictures on a webpage, a client device acquires the pictures on the webpage separately and collectively displays the pictures to the user, such that the user browses the pictures on the webpage, thereby meeting user's demand on browsing only pictures.

12 Claims, 5 Drawing Sheets

(56) References Cited

U.S. PATENT DOCUMENTS

| | | | |
|---|---|---|---|
| 2005/0197964 A1* | 9/2005 | Duggan | G06Q 30/06 705/57 |
| 2007/0073777 A1* | 3/2007 | Werwath | G06F 17/30905 |
| 2007/0083534 A1* | 4/2007 | Uematsu | G06F 17/30905 |
| 2007/0112973 A1* | 5/2007 | Harris | H04L 29/06027 709/232 |
| 2008/0085724 A1* | 4/2008 | Cormier | H04W 4/02 455/456.1 |
| 2008/0243735 A1* | 10/2008 | Rish | G06N 5/003 706/17 |
| 2010/0205292 A1* | 8/2010 | Diaz | H04L 12/40013 709/224 |
| 2011/0105146 A1* | 5/2011 | Chandrasekaran | H04L 63/107 455/456.1 |
| 2012/0042264 A1* | 2/2012 | Burckart | G06F 17/30864 715/753 |
| 2012/0143504 A1* | 6/2012 | Kalai | G01C 21/32 701/533 |
| 2012/0149346 A1* | 6/2012 | Akhtar | G06F 17/30902 455/414.2 |
| 2012/0164974 A1* | 6/2012 | Eriksson | G06F 17/3048 455/406 |
| 2013/0291126 A1* | 10/2013 | Thomson | G06F 17/30014 726/30 |
| 2017/0251434 A1* | 8/2017 | Luna | H04W 52/0261 |
| 2017/0374117 A1* | 12/2017 | Park | H04L 67/10 |

FOREIGN PATENT DOCUMENTS

| | | |
|---|---|---|
| CN | 101707748 A | 5/2010 |
| CN | 101860533 A | 10/2010 |
| CN | 102214211 A | 10/2011 |
| KR | 2011/0002918 A | 1/2011 |

OTHER PUBLICATIONS

International Search Report for International Application No. PCT/CN2012/076707 dated Sep. 6, 2012 in 2 pages.

* cited by examiner

METHOD FOR BROWSING WEBPAGE PICTURE AND CLIENT DEVICE THEREFOR

This application is a continuation of International Patent Application No. PCT/CN2012/076707, filed on Jun. 11, 2012, which claims priority to Chinese Patent Application No. 201110331362.5, filed before Chinese Patent Office on Oct. 27, 2011 and entitled "METHOD FOR BROWSING WEBPAGE PICTURE AND CLIENT DEVICE THEREFOR." These prior applications are incorporated herein by reference in their entirety.

TECHNICAL FIELD

The present disclosure relates to the field of computer technologies, and in particular, to a method for browsing a webpage picture and a client device therefor.

BACKGROUND

A browser is a client browsing program in Web services, and is capable of sending various requests to a Web server, and parsing, displaying, and playing hypertext information and various multimedia data formats that are sent by the server.

Due to complexity of a website, a webpage generally contains a large amount of text content and picture content. In the prior art, when a webpage is being browsed using the browser, content on the webpage needs to be requested from the server; upon receiving the request, the server sends all the content on the webpage, including picture and text content on the webpage, to the client device for browser; the client device displays the picture content and the text content on the same layout; and a user may browse a disordered arrangement of the pictures and text on the page, consequently causing poor user experience. In addition, in this browsing mode, the client device does not know whether the user is interested in text or pictures, and due to traffic restriction, the client device generally acquires low quality pictures. In this case, when the user desires to browse pictures, user's demand fails to be accommodated.

SUMMARY

To meet user's demand on browsing pictures on a webpage, embodiments of the present disclosure provide a method for browsing a webpage picture and a client device therefor. The technical solutions are as follows:

One aspect of the present disclosure provides a method for browsing a webpage picture, where the method includes:

receiving, by a client device, a picture mode triggered by a user when browsing a webpage;

acquiring a picture on the webpage to be browsed by the user; and displaying the picture to the user.

Further, the acquiring a picture on the webpage to be browsed by the user includes:

acquiring, by the client device, webpage content to be browsed by the user from a server, and acquiring the picture from the webpage content according to a picture label in the webpage content; or sending, by the client device, a request for browsing only pictures to the server such that the server, upon receiving the request, acquires, according to the picture label, the picture from the webpage content to be browsed by the user, and sends the picture to the client device; and receiving the picture returned by the server.

Optionally, prior to the acquiring a picture on the webpage to be browsed by the user, the method further includes:

acquiring, by the client device, an access point type of a user terminal, and sending the access point type to the server; and providing, by the server according to the access point type, a picture of a corresponding type for the webpage to be browsed by the user.

Further, the providing, by the server according to the access point type, a picture of a corresponding type for the webpage to be browsed by the user includes:

judging, by the server, whether the access point type is a preset access point type, if the access point type is the preset access point type, providing an original picture for the webpage to be browsed by the user, and if the access point type is not the preset access point type, providing a compressed picture for the webpage to be browsed by the user.

Optionally, after the displaying the picture to the user, the method further includes:

pre-reading, by the client device, a picture from content on a next page of the webpage.

Another aspect of the present disclosure provides a client device, where the client device includes:

a receiving module, configured to receive a picture mode triggered by a user when browsing a webpage;

a first acquiring module, configured to acquire a picture on the webpage to be browsed by the user after the receiving module receives the picture mode triggered by the user; and a displaying module, configured to display the picture acquired by the first acquiring module to the user.

Further, the first acquiring module specifically includes a first acquiring unit and a second acquiring unit, or alternatively specifically includes a sending unit and a receiving unit.

The first acquiring unit is configured to acquire webpage content to be browsed by the user from a server.

The second acquiring unit is configured to acquire the picture from the webpage content according to a picture label in the webpage content acquired by the first acquiring unit.

The sending unit is configured to send a request for browsing only pictures to the server, such that the server, upon receiving the request, according to the picture label, acquires the picture from the webpage content to be browsed by the user.

The receiving unit is configured to receive the picture returned by the server.

Optionally, the client device further includes:

a second acquiring module, configured to acquire an access point type of a user terminal, and sending the access point type to the server before the first acquiring module acquires a picture on the webpage to be browsed by the user; and a sending module, configured to send the access point type acquired by the second acquiring module to the server, such that the server provides, according to the access point type, a picture of a corresponding type for the webpage to be browsed by the user.

Optionally, the client device further includes:

a pre-reading module, configured to pre-read a picture from content on a next page of the webpage after the displaying module displays the picture to the user.

Another aspect of the present disclosure provides a method for browsing a webpage picture, where the method includes:

receiving an access point type reported by a client device; and providing, according to the access point type, a picture of a corresponding type for a webpage to be browsed by the client device.

Optionally, the providing, according to the access point type, a picture of a corresponding type for a webpage to be browsed by the client device includes:

judging whether the access point type is a preset access point type, if the access point type is the preset access point type, providing an original picture for the webpage to be browsed by the client device, and if the access point type is not the preset access point type, providing a compressed picture for the webpage to be browsed by the client device.

Optionally, after the providing, according to the access point type, a picture of a corresponding type for a webpage to be browsed by the client device, the method further includes:

upon receiving the request for browsing only pictures from the client device, acquiring, according to a picture label, the picture from webpage content to be browsed by the user; and sending the acquired picture to the client device.

Another aspect of the present disclosure provides a webpage server, where the webpage server includes:

a receiving module, configured to receive an access point type reported by a client device; and a providing module, configured to provide, according to the access point type, a picture of a corresponding type for a webpage to be browsed by the client device.

Optionally, the providing module includes:

a judging unit, configured to judges whether the access point type is a preset access point type;

where if the judging unit judges that the access point type is the preset access point type, the providing module provides an original picture for the webpage to be browsed by the client device; and where if the judging unit judges that the access point type is not the preset access point type, the providing module provides a compressed picture for the webpage to be browsed by the client device.

Optionally, the server further includes:

an acquiring module, configured to: upon receiving the request for browsing only pictures from the client device, acquire, according to a picture label, the picture from webpage content to be browsed by the user; and a sending module, configured to send the acquired picture to the client device.

Another aspect of the present disclosure provides a network system, where the network system includes:

a client device, where the client device is configured to receive a picture mode from a user when browsing a webpage, acquire a picture on the webpage to be browsed by the user, and display the picture to the user; and a webpage server, configured to receive an access point type reported by the client device, and provide, according to the access point type, a picture of a corresponding type for a webpage to be browsed by the client device.

The technical solutions provided in the embodiments of the present disclosure achieve the following beneficial effects:

Pictures are extracted from a webpage, and collectively displayed to a user, such that the user, if only interested in pictures on a webpage, can directly and conveniently browse the pictures on the webpage, thereby accommodating user's demand on browsing only pictures. In addition, a client device acquires an access point type of a user terminal, and sends the access point type to a server, such that the server provides, according to the access point type, a picture of a corresponding type for the webpage to be browsed by the user, thereby accommodating demands on browsing pictures at different access points. To be specific, original pictures are provided for the client device in a better network environment such that the user browses the pictures more clearly; and compressed pictures are provided for the client device in a poor network environment such that the user browses the pictures more quickly. Further, the client device pre-reads content on a next page, thereby enabling smoother browsing for the user.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objectives, technical solutions, and advantages of the present disclosure clearer, the embodiments of the present disclosure are described in detail below with reference to the accompanying drawings.

Figure 1:
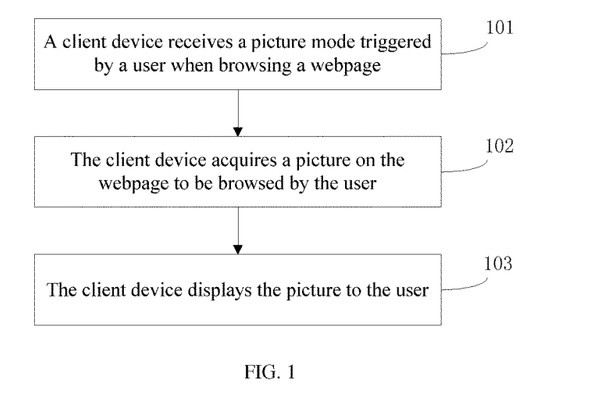
FIG. 1 is a flowchart of a method for browsing a webpage picture according to an embodiment of the present disclosure.

An embodiment of the present disclosure provides a method for browsing a webpage picture. Referring to FIG. 1, the method includes:

101. receiving, by a client device, a picture mode triggered by a user when browsing a webpage;

102. acquiring a picture on the webpage to be browsed by the user; and 103. displaying the picture to the user.

According to the method provided in the embodiments of the present disclosure, when a user is only interested in pictures on a webpage, a client device acquires the pictures on the webpage separately and displays the pictures to the user collectively, such that the user can browses the pictures on the webpage more directly and conveniently, thereby accommodating user's demand on browsing only pictures.

Figure 2:
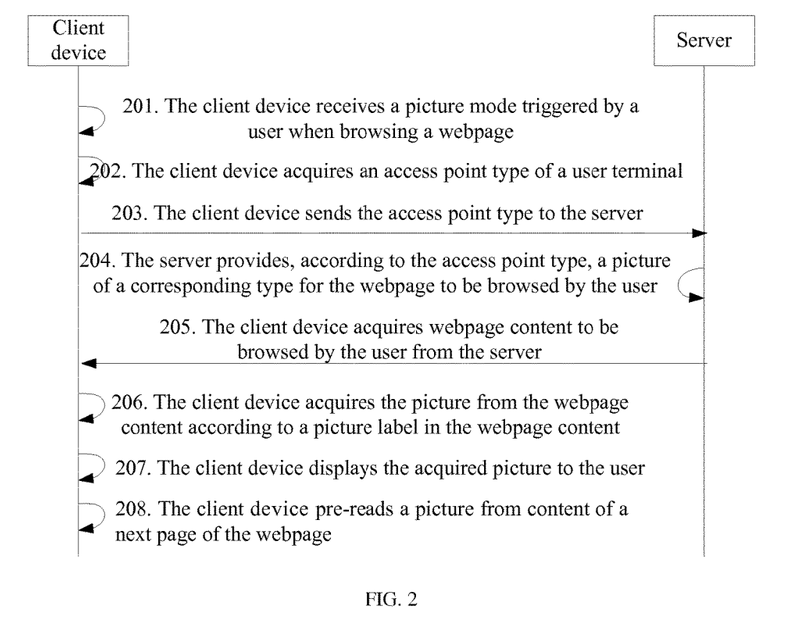
FIG. 2 is a flowchart of a method for browsing a webpage picture according to another embodiment of the present disclosure.

An embodiment of the present disclosure provides a method for browsing a webpage picture, where the interaction subjects are a client device and a server. The client device is a client device for a browser, and the server is a server for the browser. In this embodiment, the browser may be a mobile phone browser, a palm computer browser, and the like. Referring to FIG. 2, the method includes:

201. A client device receives a picture mode triggered by a user when browsing a webpage.

The picture mode is defined with respect to normally browsing a webpage. In the picture mode, during webpage browsing, pictures on the webpage are only browsed, but text portions on the webpage are not browsed.

Specifically, when browsing the webpage using a client device for browser, the user may trigger the picture mode to achieve the effect of browsing only pictures of the webpage. The picture mode may be triggered in a plurality of manners. For example, a background of the client device may insert a link for an action for triggering the picture mode, and the user triggers the picture mode by clicking the link. In addition, a "picture mode" option may be added in function options of the client device, and the user triggers the picture mode using the option.

202. The client device acquires an access point type of a user terminal.

The user terminal may access the Internet using a plurality of access point types, for example, Wireless Fidelity (Wi-Fi), 3rd Generation (3G), General Packet Radio Service (GPRS), and the like. The user may select any of the access points to access the Internet. By selecting different access points, different network environments are selected, where the network access rates are different. For example, access points such as Wi-Fi and 3G provide a better a network environment, and a high network access rate; whereas the access point such as GPRS provides a poor network environment and a low network access rate.

Each user terminal records an access point type thereof, and the client device may easily acquire the access point type.

203. The client device sends the access point type to a server.

Upon acquiring the access point type of the user terminal, the client device reports the access point type to the server.

204. The server provides, according to the access point type, a picture of a corresponding type for the webpage to be browsed by the user.

Specifically, the server judges whether the access point type is a preset access point type, if the access point type is the preset access point type, the server provides an original picture for the webpage to be browsed by the user, and if the access point type is not the preset access point type, provides a compressed picture for the webpage to be browsed by the user. The preset access point type may include Wi-Fi and 3G. The original picture is a high quality and clear picture, and the compressed picture may be a picture acquired by compressing the original picture. To be specific, with respect to different access point types, the server may provide pictures corresponding to the access point types, differentiate network environments of the client device according to the access point types, and provide pictures having corresponding quality for the webpage to be browsed. For example, in the case of Wi-Fi or 3G, an original picture is provided, and in the case of GPRS, the compressed picture is provided.

It should be noted that, according to the method provided in this embodiment, steps 202 to 204 are not needed. To be specific, the process directly skips to step 205 after step 201 is performed, which is not limited in this embodiment. Steps 202 to 204 are performed to accommodate demands on browsing pictures at different access points. To be specific, original pictures are provided for the client device in a better network environment such that the user browses the pictures more clearly; and compressed pictures are provided for the client device in a poor network environment such that the user browses the pictures more quickly. Steps 202 to 204 may be performed prior to step 201.

205. The client device acquires webpage content to be browsed by the user from the server.

Specifically, upon receiving the picture mode triggered by the user, the client device acquires all the webpage content to be browsed by the user from the server, including text content, picture content, and the like.

206. The client device acquires the picture from the webpage content according to a picture label in the webpage content.

Specifically, the client device analyzes the webpage content, extracts pictures from the webpage according to picture content labels on the webpage, and filters the remaining text content. The client device may invoke a picture viewing plug-in on the client device to implement the functions of analysis and filtering. The picture label refers to an <img> label, which is one of labels defined in the Hypertext Markup Language (HTML). In the HTML, a picture is defined using the <img> label. To be specific, each of the pictures in the webpage content is assigned an <img> label.

It should be noted that steps 205 and 206 serve as an implementation where pictures on the webpage to be browsed by the user are provided for the client device.

207. The client device displays the acquired picture to the user.

Specifically, if a plurality of pictures are acquired from the webpage, these pictures are aggregated for a centralized layout and are collectively displayed to the user; if only one picture is acquired from the webpage, the picture is full-screen displayed to the user.

208. The client device pre-reads a picture from content on a next page of the webpage.

Specifically, when the user is browsing a picture on the current webpage, the client device may automatically pre-read content on a next page, and locally store the content, such that the user directly acquires the content on the next page locally when browsing the next page. If the client device pre-acquires the access point type of the user terminal, the client device may control the number of pre-read webpages. For example, in the case of, for example, a Wi-Fi access point or a 3G access point having a better network environment, a plurality of pages of content may be sequentially pre-read; and in the case of, for example, a GPRS access point having a poor network environment, content on a next page may be only pre-read.

According to the method provided in the embodiments of the present disclosure, a client device analyzes content on a webpage, extracts pictures from the webpage, filters the remaining text content, and collectively displays the pictures to a user, such that the user, if only interested in pictures on a webpage, can directly and conveniently browse the pictures on the webpage, thereby accommodating user's demand on browsing only pictures. In addition, the client device acquires an access point type of a user terminal, and sends the access point type to a server, such that the server provides, according to the access point type, a picture of a corresponding type for the webpage to be browsed by the user, thereby accommodating demands on browsing pictures at different access points. To be specific, original pictures are provided for the client device in a better network environment such that the user browses the pictures more clearly; and compressed pictures are provided for the client device in a poor network environment such that the user browses the pictures more quickly. Further, the client device pre-reads content on a next page, thereby enabling smoother browsing for the user.

Figure 3:
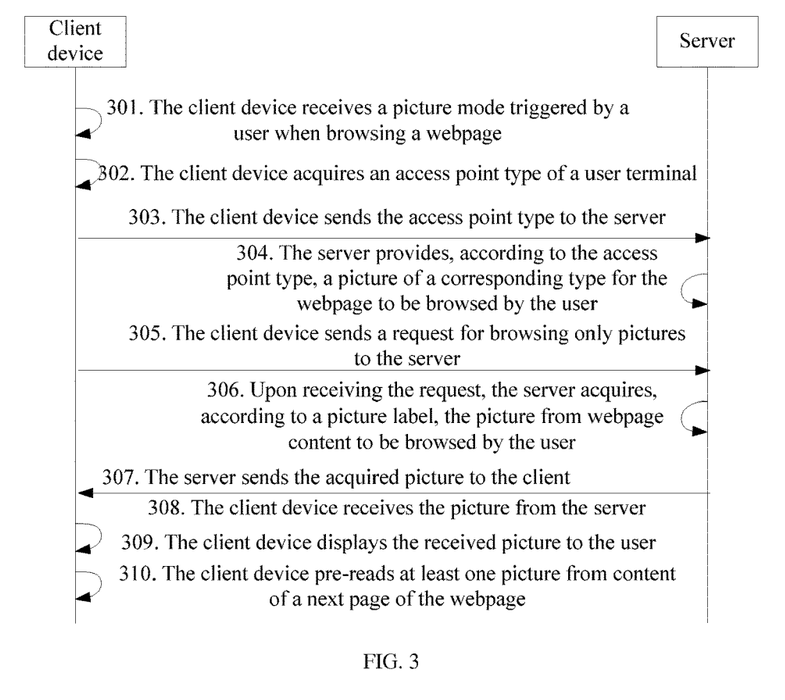
FIG. 3 is a flowchart of a method for browsing a webpage picture according to still another embodiment of the present disclosure.

An embodiment of the present disclosure provides a method for browsing a webpage picture, where the interaction subjects are a client device and a server. The client device is a client device for a browser, and the server is a server for the browser. In this embodiment, the browser may be a mobile phone browser, a palm computer browser, and the like. Referring to FIG. 3, the method includes:

301. A client device receives a picture mode triggered by a user when browsing a webpage.

302. The client device acquires an access point type of a user terminal.

303. The client device sends the access point type to a server.

304. The server provides, according to the access point type, a picture of a corresponding type for the webpage to be browsed by the user.

For specific implementation process of steps 301 to 304, reference may be made to steps 201 to 204 in the above-described embodiment, which is not described herein any further.

305. The client device sends a request for browsing only pictures to the server.

Specifically, upon receiving the picture mode triggered by the user, the client device initiates a request for browsing only pictures to the server, requesting the server to return the pictures on the webpage to be browsed by the user.

306. Upon receiving the request, the server acquires, according to a picture label, the picture from webpage content to be browsed by the user.

Specifically, the server analyzes the webpage content to be browsed by the user, extracts pictures from the webpage according to picture content labels on the webpage, and filters the remaining text content.

307. The server sends the acquired picture to the client device.

308. The client device receives the picture returned by the server.

It should be noted that steps 305 to 308 serve as an implementation where pictures on the webpage to be browsed by the user are acquired for the client device.

309. The client device displays the received picture to the user.

310. The client device pre-reads at least one picture from content on a next page of the webpage.

For specific implementation process of steps 309 to 310, reference may be made to steps 207 to 208 in the above-described embodiment, which is not described herein any further.

According to the method provided in the embodiments of the present disclosure, a client device sends a request for browsing only pictures to a server, the server extracts pictures from the webpage and sends the pictures to the client device, and the client device collectively displays the pictures to a user, such that the user, if only interested in pictures on a webpage, can directly and conveniently browse the pictures on the webpage, thereby accommodating user's demand on browsing only pictures. In addition, the client device acquires an access point type of a user terminal, and sends the access point type to a server, such that the server provides, according to the access point type, a picture of a corresponding type for the webpage to be browsed by the user, thereby accommodating demands on browsing pictures at different access points. To be specific, original pictures are provided for the client device in a better network environment such that the user browses the pictures more clearly; and compressed pictures are provided for the client device in a poor network environment such that the user browses the pictures more quickly. Further, the client device pre-reads content on a next page, thereby enabling smoother browsing for the user.

Figure 4:
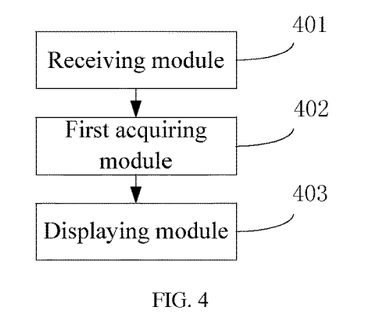
FIG. 4 is a schematic structural diagram of a client device according to an embodiment of the present disclosure.

Referring to FIG. 4, an embodiment of the present disclosure provides a client device for performing the method steps on the client device side in the above-described method embodiments. The client device includes:

a receiving module 401, configured to receive a picture mode triggered by a user when browsing a webpage;

a first acquiring module 402, configured to acquire a picture on the webpage to browsed by the user after the receiving module 401 receives the picture mode triggered by the user; and a displaying module 403, configured to display the picture acquired by the first acquiring module 402 to the user.

Figure 5:
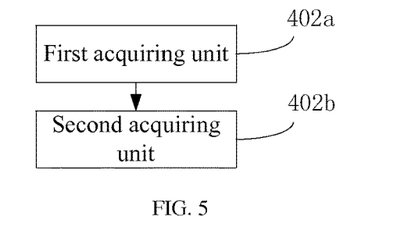
FIG. 5 is a schematic structural diagram of a first acquiring module according to an embodiment of the present disclosure.
Figure 6:
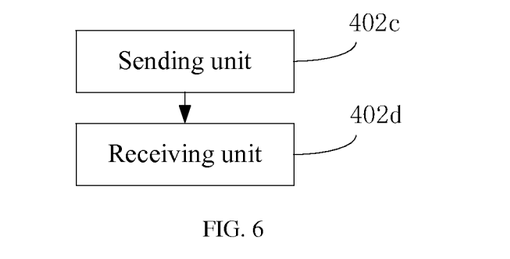
FIG. 6 is a schematic structural diagram of a first acquiring module according to another embodiment of the present disclosure.

Optionally, referring to FIG. 5, the first acquiring module 402 specifically includes a first acquiring unit 402a and a second acquiring unit 402b, or alternatively, referring to FIG. 6, the first acquiring module specifically includes a sending unit 402c and a receiving unit 402d.

The first acquiring unit 402a is configured to acquire webpage content to be browsed by the user from a server.

The second acquiring unit 402b is configured to acquire the picture from the webpage content according to a picture label in the webpage content acquired by the first acquiring unit 402a.

The sending unit 402c is configured to send a request for browsing only pictures to the server, such that the server, upon receiving the request, according to the picture label, acquires the picture from the webpage content to be browsed by the user.

The receiving unit 402d is configured to receive the picture returned by the server.

Figure 7:
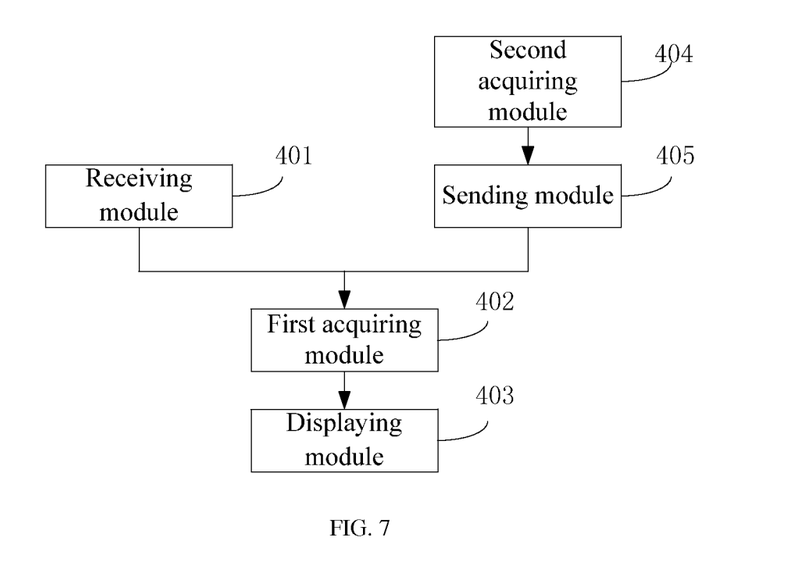
FIG. 7 is a schematic structural diagram of a client device according to another embodiment of the present disclosure.

Optionally, referring to FIG. 7, the client device further includes:

a second acquiring module 404, configured to acquire an access point type of a user terminal, and sending the access point type to the server before the first acquiring module 402 acquires a picture on the webpage to be browsed by the user; and a sending module 405, configured to send the access point type acquired by the second acquiring module 404 to the server, such that the server provides, according to the access point type, a picture of a corresponding type for the webpage to be browsed by the user.

Figure 8:
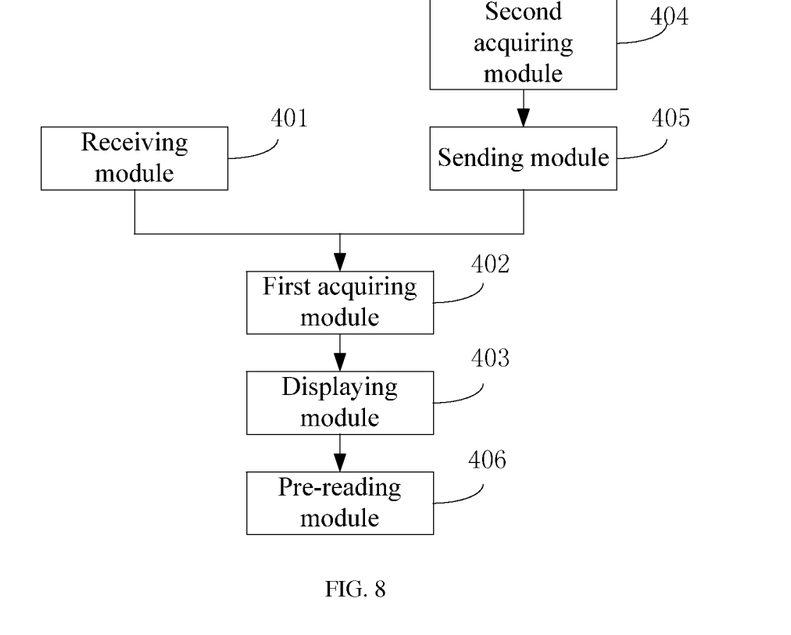
FIG. 8 is a schematic structural diagram of a client device according to still another embodiment of the present disclosure.

Optionally, referring to FIG. 8, the client device further includes:

a pre-reading module 406, configured to pre-read at least one picture from content on a next page of the webpage after the displaying module 403 displays the picture to the user.

In conclusion, according to the embodiments of the present disclosure, a client device analyzes content on a webpage, extracts pictures on the webpage, filters the remaining text content, and collectively display the pictures to a user, such that the user, if only interested in pictures on a webpage, can directly and conveniently browse the pictures on the webpage, thereby accommodating user's demand on browsing only pictures. In addition, the client device acquires an access point type of a user terminal, and sends the access point type to a server, such that the server provides, according to the access point type, a picture of a corresponding type for the webpage to be browsed by the user, thereby accommodating demands on browsing pictures at different access points. To be specific, original pictures are provided for the client device in a better network environment such that the user browses the pictures more clearly; and compressed pictures are provided for the client device in a poor network environment such that the user browses the pictures more quickly. Further, the client device pre-reads content on a next page, thereby enabling smoother browsing for the user.

It should be noted that, during browsing webpage picture over the client device provided in the above embodiment, the client device is described by only using the division of the functional modules as an example. In practice, the functions may be assigned to different functional modules for implementation as required. To be specific, the internal structure of the client device is divided into different functional modules to implement all or part of the above-described functions. In addition, the client device provided in the above embodiments is based on the same inventive concept as the method for browsing a webpage picture. The specific implementation thereof is elaborated in the method embodiments, which is not described herein any further.

Figure 9:
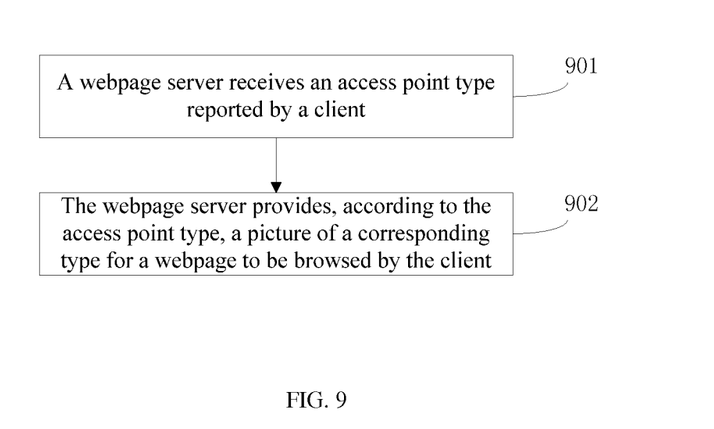
FIG. 9 is a flowchart of a method for browsing a webpage picture according to yet still another embodiment of the present disclosure.

An embodiment of the present disclosure provides a method for browsing a webpage picture, where the interaction subjects are a client device and a server. The client device is a client device for a browser, and the server is a webpage server for the browser. In this embodiment, the browser may be a mobile phone browser, a palm computer browser, and the like. Referring to FIG. 9, the method includes:

901. A webpage server receives an access point type reported by a client device.

902. The webpage server provides, according to the access point type, a picture of a corresponding type for a webpage to be browsed by the client device.

Optionally, the providing, according to the access point type, a picture of a corresponding type for a webpage to be browsed by the client device includes:

judging whether the access point type is a preset access point type, if the access point type is the preset access point type, providing an original picture for the webpage to be browsed by the client device, and if the access point type is not the preset access point type, providing a compressed picture for the webpage to be browsed by the client device.

Optionally, after the providing, according to the access point type, a picture of a corresponding type for a webpage to be browsed by the client device, the method further includes:

upon receiving the request for browsing only pictures from the client device, acquiring, according to a picture label, the picture from webpage content to be browsed by the user; and sending the acquired picture to the client device.

Figure 10:
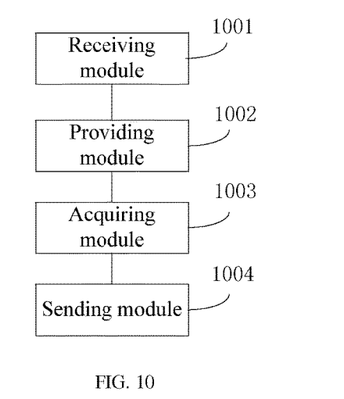
FIG. 10 is a schematic structural diagram of a server according to yet still another embodiment of the present disclosure.

Referring to FIG. 10, an embodiment of the present disclosure provides a webpage server for performing the method steps on the network side in a previous method embodiment. The webpage server includes:

a receiving module 1001, configured to receive an access point type reported by a client device; and a providing module 1002, configured to provide, according to the access point type, a picture of a corresponding type for a webpage to be browsed by the client device.

Optionally, the providing module 1002 includes:

a judging unit, configured to judges whether the access point type is a preset access point type;

where if the judging unit judges that the access point type is the preset access point type, the providing module 1002 provides an original picture for the webpage to be browsed by the client device; and where if the judging unit judges that the access point type is not the preset access point type, the providing module 1002 provides a compressed picture for the webpage to be browsed by the client device.

The server further includes:

an acquiring module 1003, configured to: upon receiving the request for browsing only pictures from the client device, acquire, according to a picture label, the picture from webpage content to be browsed by the user; and a sending module 1004, configured to send the acquired picture to the client device.

Figure 11:
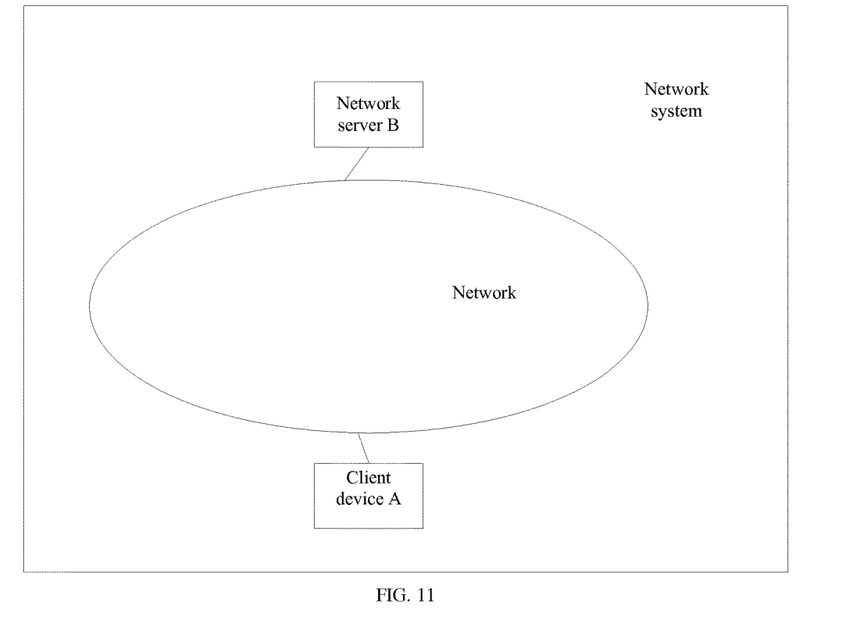
FIG. 11 is a schematic architectural diagram of a network system according to an embodiment of the present disclosure.

An embodiment of the present disclosure provides a network system. Referring to FIG. 11, the network system includes:

a client device A, configured to receive a picture mode from a user when browsing a webpage, acquire a picture on the webpage to be browsed by the user, and display the picture to the user; and a webpage server B, configured to receive an access point type reported by the client device, and provide, according to the access point type, a picture of a corresponding type for a webpage to be browsed by the client device.

A person skilled in the art should understand that all or part of steps of the preceding methods may be implemented by hardware or hardware following instructions of programs. The programs may be stored in a non-transitory computer-readable storage medium and may be executed by at least one processor. The storage medium may be a read-only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for browsing a webpage picture, comprising:
   receiving, by a client device, a picture mode triggered by a user when browsing a webpage;
   providing, by a server according to an access point type of a user terminal, a picture of a corresponding type for the webpage to be browsed by the user, the types of the picture comprising an original picture and a compressed picture;
   acquiring a picture on the webpage to be browsed by the user;
   displaying the picture to the users;
   pre-reading, by the client device, at least one picture from content on a next page of the webpage in case of the access point type having a poor network environment; and
   pre-reading, by the client device, pictures from a plurality of pages in case of the access point type having a better network environment.

2. The method according to claim 1, wherein the acquiring a picture on the webpage to be browsed by the user comprises:

acquiring, by the client device, webpage content to be browsed by the user from a server, and acquiring the picture from the webpage content according to a picture label in the webpage content; or sending, by the client device, a request for browsing only pictures to the server such that the server, upon receiving the request, acquires, according to the picture label, the picture from the webpage content to be browsed by the user, and sends the picture to the client device; and receiving the picture returned by the server.

3. The method according to claim 2, wherein prior to the providing, by the server according to the access point type of a user terminal, a picture of a corresponding type for the webpage to be browsed by the user, the method comprises:

acquiring, by the client device, the access point type of the user terminal, and sending the access point type to the server.

4. The method according to claim 3, wherein the providing, by the server according to the access point type, a picture of a corresponding type for the webpage to be browsed by the user comprises:

judging, by the server, whether the access point type is a preset access point type, if the access point type is the preset access point type, providing an original picture for the webpage to be browsed by the user, and if the access point type is not the preset access point type, providing a compressed picture for the webpage to be browsed by the user.

5. The method according to claim 1, wherein the access point type indicates one of a GPRS access point, a Wi-Fi access point and a 3G access point; and wherein, the GPRS access point has the poor network environment, and the Wi-Fi access point and the 3G access point have the better network environment.

6. A client device, comprising a processor and computer readable storage media storage media storing instructions that, when executed by the processor, cause the processor to:

receive a picture mode triggered by a user when browsing a webpage;

send an access point type to a server, such that the server provides, according to the access point type, a picture of a corresponding type for the webpage to be browsed by the user, the types of the picture comprising an original picture and a compressed picture;

acquire a picture on the webpage to be browsed by the user after receiving the picture mode triggered by the user;

display the acquired picture to the user; and pre-read at least one picture from content on a next page of the webpage in case of the access point type having a poor network environment after displaying the picture to the user, and pre-read pictures from a plurality of pages in case of the access point type having a better network environment after displaying the picture to the user.

7. The client device according to claim 6, wherein the instructions further cause the processor to:

acquire webpage content to be browsed by the user from a server, and acquire the picture from the webpage content according to a picture label in the webpage content;

send a request for browsing only pictures to the server, such that the server, upon receiving the request, according to the picture label, acquires the picture from the webpage content to be browsed by the user; and receive the picture returned by the server.

8. The client device according to claim 7, wherein the instructions further cause the processor to:

acquire the access point type of the user terminal, and send the access point type to the server before the picture on the webpage to be browsed by the user is acquired.

9. The client device according to claim 6, wherein the access point type indicates one of a GPRS access point, a Wi-Fi access point and a 3G access point; and wherein, the GPRS access point has the poor network environment, and the Wi-Fi access point and the 3G access point have the better network environment.

10. A method for browsing a webpage picture, comprising:

receiving an access point type reported by a client device;

judging whether the access point type is a preset access point type, if the access point type is the preset access point type, providing an original picture for the webpage to be browsed by the client device, and if the access point type is not the preset access point type, providing a compressed picture for the webpage to be browsed by the client device;

pre-reading, by the client device, at least one picture from content on a next page of the webpage in case of the access point type having a poor network environment; and pre-reading pictures from a plurality of pages in case of the access point type having a better network environment.

11. The method according to claim 10, wherein after the providing, according to the access point type, a picture of a corresponding type for the webpage to be browsed by the client device, the method comprises upon receiving the request for browsing only pictures from the client device, acquiring, according to a picture label, the picture from webpage content to be browsed by the user; and sending the acquired picture to the client device.

12. The method according to claim 10, wherein the access point type indicates one of a GPRS access point, a Wi-Fi access point and a 3G access point; and wherein, the GPRS access point has the poor network environment, and the Wi-Fi access point and the 3G access point have the better network environment.

* * * * *

UNITED STATES PATENT AND TRADEMARK OFFICE
CERTIFICATE OF CORRECTION

PATENT NO. : 10,015,284 B2
APPLICATION NO. : 14/261291
DATED : July 3, 2018
INVENTOR(S) : Fei Xu et al.

Page 1 of 1

It is certified that error appears in the above-identified patent and that said Letters Patent is hereby corrected as shown below:

In the Claims

Column 12, Line 6, in Claim 7, change "content;" to --content; or--.

Column 12, Line 10, in Claim 7, change "user;" to --user,--.

Signed and Sealed this
Twenty-third Day of April, 2019

Andrei Iancu
*Director of the United States Patent and Trademark Office*